United States Patent
Bhardwaj et al.

(10) Patent No.: US 9,817,462 B2
(45) Date of Patent: Nov. 14, 2017

(54) DECENTRALIZED ARCHITECTURE FOR DYNAMIC RESOURCE MANAGEMENT

(71) Applicant: MICROSOFT TECHNOLOGY LICENSING, LLC, Redmond, WA (US)

(72) Inventors: Abhishek Bhardwaj, Bellevue, WA (US); Devlin David Bentley, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 156 days.

(21) Appl. No.: 14/495,650

(22) Filed: Sep. 24, 2014

(65) Prior Publication Data

US 2016/0048189 A1   Feb. 18, 2016

Related U.S. Application Data

(60) Provisional application No. 62/037,883, filed on Aug. 15, 2014.

(51) Int. Cl.
*G06F 1/00* (2006.01)
*G06F 1/32* (2006.01)
(Continued)

(52) U.S. Cl.
CPC ............ *G06F 1/3206* (2013.01); *G06F 1/163* (2013.01); *G06F 1/3203* (2013.01);
(Continued)

(58) Field of Classification Search
CPC ......... G09G 2330/021; G09G 2360/16; G09G 2320/0626; G06F 1/3265; G06F 1/3206; G06F 1/3218
See application file for complete search history.

(56) References Cited

U.S. PATENT DOCUMENTS 8,063,872 B2   11/2011  Forstall et al.
8,260,373 B2 *  9/2012  Lee .................... G06F 1/3203
                                                          455/550.1
(Continued)

FOREIGN PATENT DOCUMENTS

EP    1191427 A2   3/2002
EP    2040144 A1   3/2009

OTHER PUBLICATIONS

ISA European Patent Office, International Search Report and Written Opinion Issued in Application No. PCT/US2015/044941, dated Nov. 26, 2015, WIPO, 14 pages.
Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.
(Continued)

*Primary Examiner* — Xuxing Chen
(74) *Attorney, Agent, or Firm* — Alleman Hall Creasman & Tuttle LLP

(57) ABSTRACT

An electronic device includes a compute system configured to concurrently execute a primary application and one or more secondary applications, one or more subsystems configured to operate in a full-power mode and one or more reduced-power modes, and a resource management module including one or more power mode timers. The resource management module sets a full-power mode timer based on an application-specific full-power requirement for the primary application executing on the electronic device, and instructs the one or more subsystems to operate in full-power mode for a duration of the full-power mode timer. Responsive to an indication of an input to the electronic device, the indication including an input-specific full-power requirement, the resource management module increases the duration of the full-power mode timer based on the duration of the application-specific full-power requirement for the primary application.

20 Claims, 8 Drawing Sheets

(51) Int. Cl.
*G06F 1/16* (2006.01)
*H04W 52/02* (2009.01)

(52) U.S. Cl.
CPC .......... *G06F 1/3234* (2013.01); *G06F 1/3265* (2013.01); *H04W 52/0251* (2013.01); *G06F 1/3218* (2013.01); *G09G 2320/0626* (2013.01); *G09G 2330/021* (2013.01); *G09G 2360/16* (2013.01)

(56) References Cited

U.S. PATENT DOCUMENTS

| | | |
|---|---|---|
| 8,487,918 B1 | 7/2013 | Nelissen et al. |
| 8,493,316 B2 | 7/2013 | Shabel et al. |
| 8,687,840 B2 | 4/2014 | Samanta Singhar |
| 2009/0312059 A1 | 12/2009 | Pratt et al. |
| 2011/0098583 A1 | 4/2011 | Pandia et al. |
| 2012/0110360 A1 | 5/2012 | Lin et al. |
| 2012/0281027 A1 | 11/2012 | Kim |
| 2014/0104241 A1 | 4/2014 | Huppi et al. |

OTHER PUBLICATIONS

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.

"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.

Poeter, Damon, "Meet Simband, Samsung's Next-Gen Health Tracker", http://www.pcmag.com/article2/0,2817,2458663,00.asp, May 28, 2014, 5 pages.

"Automatically Change Android Screen Brightness by Application", Published on: Dec. 2, 2013 Available at: http://profileify.wordpress.com/2010/12/06/automatically-change-android-screen-brightness-by-application/.

Sorp, Collin, "Free App: Leave it on for BlackBerry Leaves your Screen on for Apps you Choose", Published on: Aug. 12, 2011 Available at: http://www.pocketberry.com/2011/08/12/free-app-leave-it-on-for-blackberry-leaves-your-screen-on-for-apps-you-choose/.

* cited by examiner

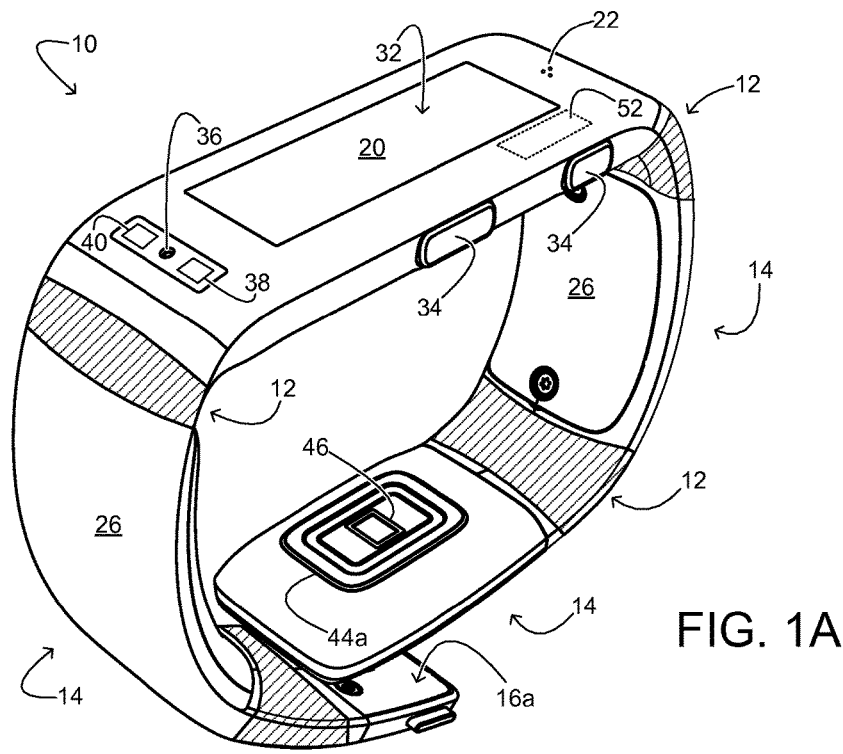
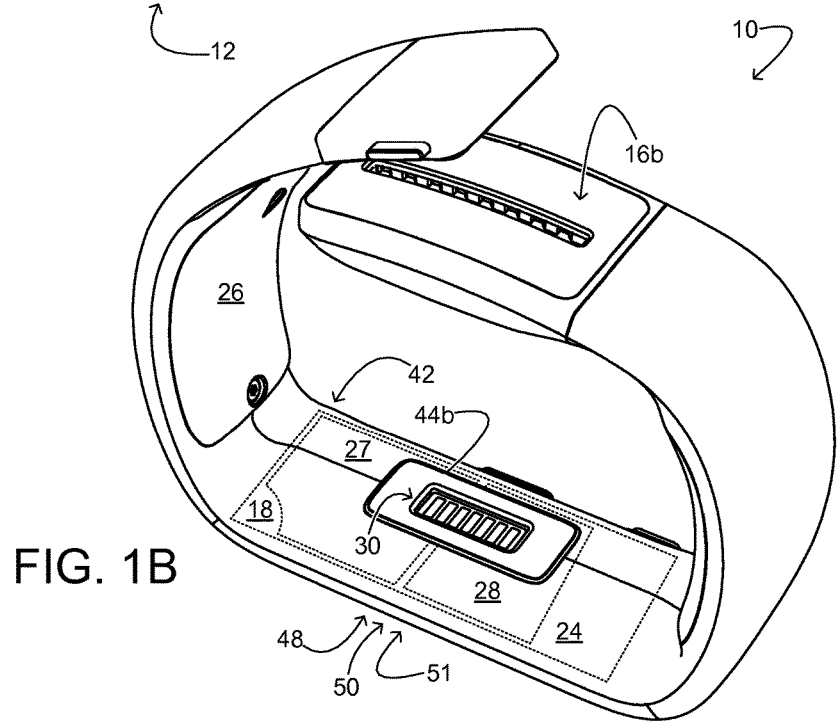
FIG. 1A
FIG. 1B

DECENTRALIZED ARCHITECTURE FOR DYNAMIC RESOURCE MANAGEMENT

CROSS REFERENCE TO RELATED APPLICATIONS

This application claims priority to U.S. Application No. 62/037,883, filed Aug. 15, 2014, and titled "DYNAMIC POWER MANAGEMENT FOR ELECTRONIC DEVICES", the entire disclosure of which is incorporated by reference for all purposes.

BACKGROUND

Portable electronic devices have limited battery capacity. Maintaining device systems at full power when the device is not in use may reduce the life of a battery charge.

BRIEF DESCRIPTION OF THE DRAWINGS

FIGS. 1A and 1B show an example electronic device.

DETAILED DESCRIPTION

Figure 2:
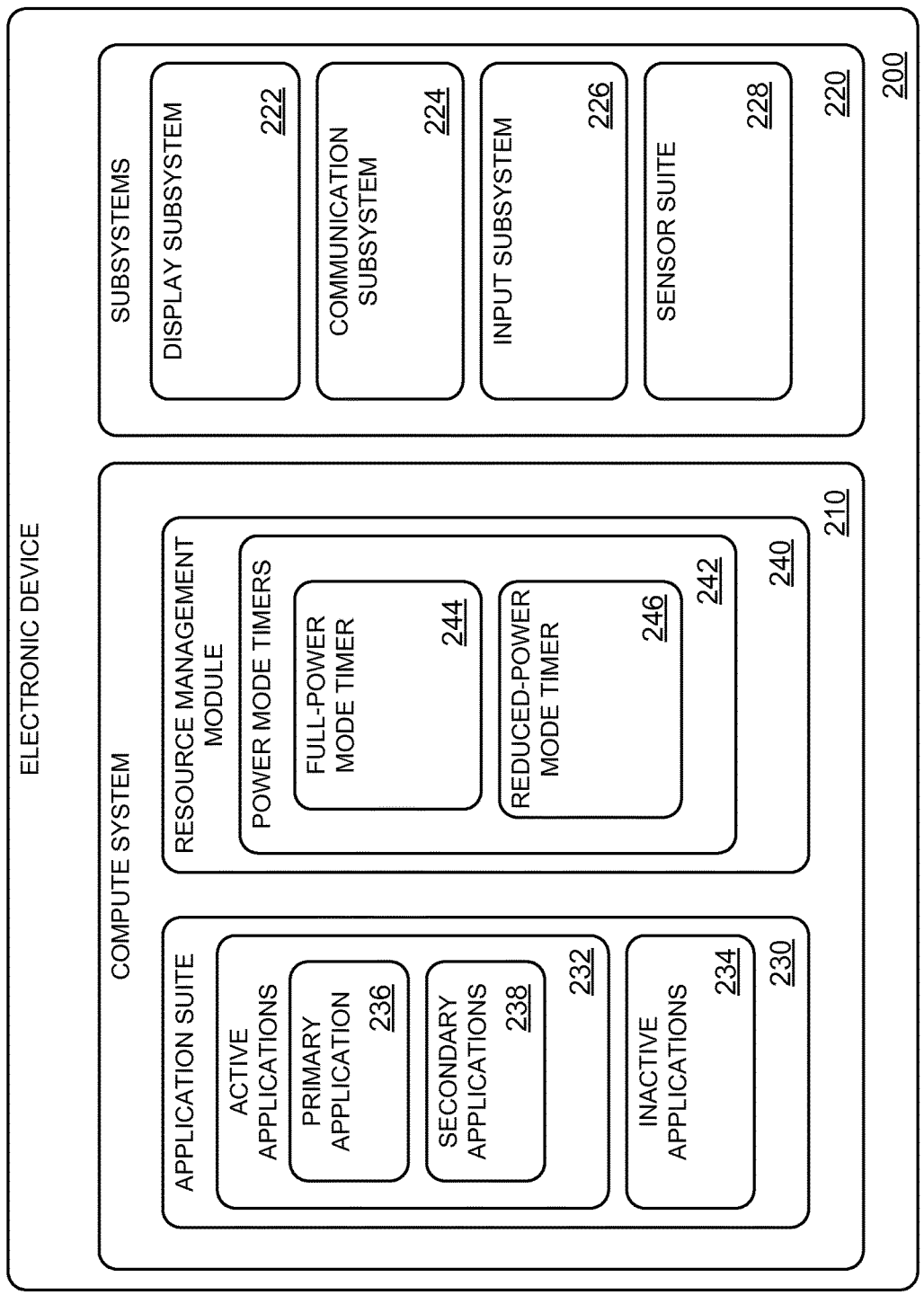
FIG. 2 schematically shows a system for an electronic device including a resource management module and an application suite.

The present disclosure is directed to dynamically managing power in an electronic device. Subsystems of the electronic device are instructed to operate at full-power or at one or more reduced-power settings based on the active applications running on the electronic device. Input received at the device is also used to determine when to switch between full-power and reduced power-settings.

Electronic devices often use an LCD display including a backlight. The backlight is one of the most power-consumptive elements of many portable electronic devices. Accordingly, electronic devices may dim the backlight after a period of inactivity, and turn the backlight off completely after an additional period of inactivity. Devices may be configured with a global backlight dimming time and global backlight-off time, and the exact time durations may be adjustable by a user through a system preference interface. However, using fixed, global time requirements may not enable sufficient resource management or a favorable user experience. For example, a user initiating a music streaming application often will not interact with the device once the music has started. The amount of power consumed by the backlighting could be reduced after a short duration of time without negatively impacting the user experience. On the other hand, a user executing a fitness regimen in accordance with a fitness application may desire to view the screen throughout the regimen without being required to interact with the device in order to maintain the backlighting.

Further, the device may receive inputs such as user inputs, notifications, calendar items, or indications from applications running in the background. In order to respond to the input or to provide an indication to the user, the backlighting settings may be adjusted. If these adjustments are not made in the context of the active applications being executed and the overall device usage, both power savings and user experience may be lessened.

According to this disclosure, a resource management module may set a full-power mode timer based on an application-specific full-power requirement for the primary application executing on an electronic device, and further set a reduced-power mode timer based on an application-specific reduced-power requirement for the primary application. Following a triggering event, individual applications and/or drivers may indicate power requirements to the resource management module. Based on these requirements, the resource management module may instruct one or more subsystems to operate in full-power mode for the duration of the full-power mode timer. Among other events, triggering events may include initiation of an application, switching of primary applications, deactivation of an application, and/or receipt of various inputs to the electronic device. Responsive to the full-power mode timer lapsing, the resource management module may instruct the one or more subsystems to operate in reduced-power mode for the duration of the reduced-power mode timer. If a new primary application is selected, the power mode timers may be reset based on the application-specific power requirements for the new primary application. The resource management module may receive indications of input to the electronic device, including input-specific power requirements. Based on the input-specific power requirements, the application-specific power requirements for the primary application, and the amount of timing left on the power mode timers, the power mode timers may be adjusted accordingly. The resource management module may store active application power requirements in a data structure in order to manage multiple counter-indicative power requirements. In addition to managing backlighting power, the resource management module may issue instructions to other subsystems of an electronic device operable in one or more reduced-power modes.

FIGS. 1A and 1B show aspects of an example sensory-and-logic system in the form of a wearable electronic device 10. The illustrated device is band-shaped and may be worn around a wrist. Device 10 includes at least four flexion regions 12 linking less flexible regions 14. The flexion regions of device 10 may be elastomeric in some examples. Fastening componentry 16A and 16B is arranged at both ends of the device. The flexion regions and fastening componentry enable the device to be closed into a loop and to be worn on a user's wrist. In other implementations, wearable electronic devices of a more elongate band shape may be worn around the user's bicep, waist, chest, ankle, leg, head, or other body part. The device, for example, may take the form of eye glasses, a head band, an arm-band, an ankle band, a chest strap, or an implantable device to be implanted in tissue.

Wearable electronic device 10 includes various functional components integrated into regions 14. In particular, the electronic device includes a compute system 18, display 20, loudspeaker 22, communication suite 24, and various sensors. These components draw power from one or more energy-storage cells 26. A battery—e.g., a lithium ion battery—is one type of energy-storage cell suitable for this purpose. Examples of alternative energy-storage cells include super- and ultra-capacitors. In devices worn on the user's wrist, the energy-storage cells may be curved to fit the wrist, as shown in the drawings.

In general, energy-storage cells 26 may be replaceable and/or rechargeable. In some examples, recharge power may be provided through a universal serial bus (USB) port 30, which includes a magnetic latch to releasably secure a complementary USB connector. In other examples, the energy storage cells may be recharged by wireless inductive or ambient-light charging. In still other examples, the wearable electronic device may include electro-mechanical componentry to recharge the energy storage cells from the user's adventitious or purposeful body motion. For example, batteries or capacitors may be charged via an electromechanical generator integrated into device 10. The generator may be turned by a mechanical armature that turns while the user is moving and wearing device 10.

In wearable electronic device 10, compute system 18 is situated below display 20 and operatively coupled to the display, along with loudspeaker 22, communication suite 24, and the various sensors. The compute system includes a data-storage machine 27 to hold data and instructions, and a logic machine 28 to execute the instructions. Aspects of the compute system are described in further detail with reference to FIG. 5.

Display 20 may be any suitable type of display. In some configurations, a thin, low-power light emitting diode (LED) array or a liquid-crystal display (LCD) array may be used. An LCD array may be backlit in some implementations. In other implementations, a reflective LCD array (e.g., a liquid crystal on silicon, LCOS array) may be frontlit via ambient light. A curved display may also be used. Further, AMOLED displays or quantum dot displays may be used.

Communication suite 24 may include any appropriate wired or wireless communications componentry. In FIGS. 1A and 1B, the communications suite includes USB port 30, which may be used for exchanging data between wearable electronic device 10 and other computer systems, as well as providing recharge power. The communication suite may further include two-way Bluetooth, Wi-Fi, cellular, near-field communication and/or other radios. In some implementations, the communication suite may include an additional transceiver for optical, line-of-sight (e.g., infrared) communication.

In wearable electronic device 10, touch-screen sensor 32 is coupled to display 20 and configured to receive touch input from the user. The touch sensor may be resistive, capacitive, or optically based. Pushbutton sensors may be used to detect the state of push buttons 34, which may include rockers. Input from the pushbutton sensors may be used to enact a home-key or on-off feature, control audio volume, turn the microphone on or off, etc.

FIGS. 1A and 1B show various other sensors of wearable electronic device 10. Such sensors include microphone 36, visible-light sensor 38, ultraviolet sensor 40, and ambient temperature sensor 42. The microphone provides input to compute system 18 that may be used to measure the ambient sound level or receive voice commands from the wearer. Input from the visible-light sensor, ultraviolet sensor, and ambient temperature sensor may be used to assess aspects of the wearer's environment—i.e., the temperature, overall lighting level, and whether the wearer is indoors or outdoors.

FIGS. 1A and 1B show a pair of contact sensor modules 44A and 44B, which contact the wearer's skin when wearable electronic device 10 is worn. The contact sensor modules may include independent or cooperating sensor elements, to provide a plurality of sensory functions. For example, the contact sensor modules may provide an electrical resistance and/or capacitance sensory function, which measures the electrical resistance and/or capacitance of the wearer's skin. Compute system 18 may use such input to assess whether or not the device is being worn, for instance.

In some implementations, the sensory function may be used to determine how tightly the wearable electronic device is being worn. In the illustrated configuration, the separation between the two contact-sensor modules provides a relatively long electrical path length, for more accurate measurement of skin resistance. In some examples, a contact sensor module may also provide measurement of the wearer's skin temperature. Arranged inside contact sensor module 44B in the illustrated configuration is the optical heart rate sensor 46. The optical heart rate sensor may include an optical source and matched optical sensor to detect blood flow through the capillaries in the skin and thereby provide a measurement of the wearer's heart rate, blood oxygen level, blood glucose level, or other biomarkers with optical properties.

Wearable electronic device 10 may also include motion sensing componentry, such as an accelerometer 48, gyroscope 50, and magnetometer 51. The accelerometer and gyroscope may furnish inertial and/or rotation rate data along three orthogonal axes as well as rotational data about the three axes, for a combined six degrees of freedom. This sensory data can be used to provide a pedometer/calorie-counting function, for example. Data from the accelerometer and gyroscope may be combined with geomagnetic data from the magnetometer to further define the inertial and rotational data in terms of geographic orientation. The wearable electronic device may also include a global positioning system (GPS) receiver 52 for determining the wearer's geographic location and/or velocity. In some configurations, the antenna of the GPS receiver may be relatively flexible and extend into flexion regions 12.

Compute system 18, via the sensory functions described herein, is configured to acquire various forms of information about the wearer of wearable electronic device 10. Such information must be acquired and used with utmost respect for the wearer's privacy. Accordingly, the sensory functions may be enacted subject to opt-in participation of the wearer. In implementations where personal data is collected on the device and transmitted to a remote system for processing, that data may be anonymized. In other examples, personal data may be confined to the wearable electronic device, and only non-personal, summary data transmitted to the remote system.

FIG. 2 schematically shows an example electronic device 200. Electronic device 200 may take the physical form of wearable electronic device 10 of FIG. 1 or any other suitable physical form. Electronic device 200 includes compute system 210 and one or more subsystems 220. Compute system 210 may include one or more data-storage machines and one or more logic machines. Examples of data-storage machines and logic machines are described with regards to FIG. 6. Subsystems 220 include display subsystem 222, communication subsystem 224, input subsystem 226, and sensor suite 228, and may include other subsystems not shown in FIG. 2.

Subsystems 220 may be configured to operate in a full-power mode and further configured to operate in one or more reduced-power modes. For example, display subsystem 222 may include a backlit display. The full-power mode for the display subsystem may thus include a full-power backlighting mode, a first reduced-power mode for the display subsystem may include a reduced-power (dimmed) backlighting mode, and a second reduced-power mode for the display subsystem may include a backlighting-off mode. Communication subsystem 224 may be configured to retrieve data at regular intervals in a full-power mode. Reduced-power modes for communication subsystem 224 may thus include a reduction in data-retrieval frequency. Similarly, input subsystem 226 may include a microphone, and be configured to turn the microphone on and off at regular intervals in a full-power mode to listen for voice input. Reduced-power modes for input subsystem 226 may thus include a reduction in the frequency the microphone is turned on. Sensor suite 228 may include an optical heart rate sensor. Reduced-power modes for sensor suite 228 may include a lower heart rate sampling rate, and thus a reduction in the amount of time the optical sources and sensors of the heart rate sensor are turned on. In some examples, compute system 210 may be configured to operate in one or more reduced-power modes. For example, a data-storage machine may be operable in an awake (full-power) mode and an asleep (reduced-power mode). In such examples, the power control module may instruct the compute system to operate in a full-power mode and one or more reduced-power modes. In general, any subsystem that is capable of consuming two or more different levels of energy may be controlled according to the described strategies.

Compute system 210 may be configured to execute two or more applications concurrently (e.g., software applications, firmware applications, or other applications). For example, compute system 210 includes application suite 230. Application suite 230 includes active applications 232 and inactive applications 234. Active applications 232 include a primary application 236 and one or more secondary applications 238. Compute system 210 may thus be configured to concurrently execute a primary application and one or more secondary applications. Applications may be activated or inactivated by a user, and/or by compute system 210. Similarly, a primary application may be selected by a user and/or by compute system 210.

In some scenarios, all of the applications within application suite 230 may be inactive applications, for example at start-up of electronic device 200. The maximum number of active applications may be based on the parameters of compute system 210, such as a quantity of available random-access memory and/or processing capacity. Inactive applications may remain stored on compute system 210 while they are not executing.

Primary application 236 may comprise an application that is currently configured for interaction with a user. The primary application may include a graphic user interface (GUI) displayed on display subsystem 222. Aspects of input subsystem 226 may be configured to interpret input commands related to the primary application. In contrast, secondary applications may comprise applications that are executing in the background of application suite 230. The user may not be able to view the GUI for the secondary applications and may not be able to interact with the secondary applications via input subsystem 226. In some scenarios, all active applications may be designated secondary applications. For example, all applications may be executing in the background of application suite 230 while the user is viewing a home screen. When an application has been deselected as the primary application, a secondary or inactive application may be selected as a new primary application. The previous primary application may thus be designated as a secondary application. Upon closing of a primary application, the closed application may then be designated as an inactive application. A new primary application may then be selected, or may be automatically promoted by compute system 210 from the group of secondary applications.

Over the course of operation, electronic device 200 may experience a series of triggering events. Among other events, triggering events may include initiation of an application, switching of primary applications, deactivation of an application, and/or receipt of various inputs to the electronic device. Each triggering event may be accompanied by an indication by an application and/or driver as to how the resources of electronic device 200 should be managed. The indication may include one or more resource allocation requirements. The resource allocation requirements may be hard requirements or soft requirements. In general, hard requirements may be context based and indicated by an application or internal driver. Soft requirements may be associated with incoming spontaneous events, such as screen touches, button presses, incoming messages, etc. Hard requirements may be persistent. In other words, hard requirements may remain in place until they are specifically removed, for example, by the closing of an application. Hard requirements may in effect overrule soft requirements while the hard requirements are in place. For the purposes of this application, hard requirements will be represented as application-specific requirements, while soft requirements will be represented as input-specific requirements, though hard requirements may be included with non-application associated trigger events and soft requirements may be included with non-input associated trigger events.

Each application may include application-specific power requirements. The application-specific power requirements may include application-specific full-power requirements and application-specific reduced-power requirements. For example, each application may include application-specific power requirements related to the display subsystem. An application may indicate a duration for the display to operate in a full-power backlighting mode and a duration for the display to operate in a reduced-power backlighting mode after a triggering event. In other words, an application may indicate a first length of time before the display backlight is dimmed after a triggering event, and a second length of time before the backlight is turned off completely after the triggering event. In some examples, the reduced-power requirements may indicate multiple stages of power-reduction for subsystems capable of operating in multiple reduced-power modes.

The application-specific power requirements may be specific to each application of application suite 230. In some examples, a user may be able to adjust the application-specific power requirements through user-configurable preferences. The application-specific power requirements may be set such that the application-specific full-power requirement is infinite. For example, a user may desire to have a display operating at full-power whenever a certain application is designated as the primary application. The application-specific power requirements may be set such that the application-specific reduced-power requirement is infinite. For example, a user may desire to have a display operating at reduced-power but not to shut off the backlighting completely for certain applications. The application-specific power requirements may be set such that the application-specific reduced-power requirement is zero. For example, a user may desire to have a display operating in either a full-power backlighting mode or a backlighting-off mode for certain applications. The display would thus not operate in a reduced-backlighting mode when such an application is selected as the primary application. Requirements may be established such that an application-specific reduced-power requirement must have a duration greater than or equal to an application-specific full-power requirement. Each application may have multiple application-specific power requirements relating to different subsystems. For example, an application may include requirements for the display subsystem and separate requirements for the communication subsystem. In one example, a messaging application may include power requirements that maintain the communication system at full power during time periods where the display subsystem is operated in a reduced-backlighting mode.

The application-specific power requirements for active applications 232 may be managed by resource management module 240. Resource management module 240 may include one or more power mode timers 242. In this example, resource management module 240 includes a full-power mode timer 244 and a reduced-power mode timer 246. The duration of full-power mode timer 244 may be set based on the application-specific full-power requirement for primary application 236. Resource management module 240 may thus instruct one or more subsystems 220 to operate in full-power mode for the duration of the full-power mode timer. The duration of reduced-power mode timer 246 may be set based on an application-specific reduced-power requirement for primary application 236. In examples where applications have multiple application-specific power requirements relating to different subsystems, the resource management module may manage multiple power mode timers relating to the different subsystems. In some examples, resource management for each different subsystem may be managed by a separate resource management module.

Responsive to full-power mode timer 244 lapsing, resource management module 240 may instruct one or more subsystems 220 to operate in a first reduced-power mode for the remaining duration of reduced-power mode timer 246. Responsive to the reduced-power mode timer lapsing, resource management module 240 may thus instruct one or more subsystems 220 to operate in a second reduced-power mode. The reduced-power mode timer may initiate and elapse concurrent with the full-power mode timer, then continue to elapse when the full-power mode timer lapses. However, the power control module would not instruct a subsystem to operate in a reduced-power mode prior to the full-power mode lapsing. In some examples, the reduced-power mode timer may initiate and elapse only following the lapsing of the full-power mode timer. Reduced-power requirements may thus be expressed in terms of a duration following the lapsing of the full-power mode timer, as opposed to a duration following the present time.

For example, primary application 236 may include a full-power backlighting mode requirement of 15 seconds and a reduced-power backlighting mode requirement of 25 seconds after the application is launched. In the absence of any additional user input, full-power mode timer 244 would then elapse for 15 seconds and reduced-power mode timer 246 would then elapse for 25 seconds. When 15 seconds elapse, resource management module 240 would instruct display subsystem 222 to operate in a reduced-power backlighting mode. Reduced-power mode timer 246 would then elapse for 10 additional seconds. Responsive to reduced-power mode timer 246 lapsing, resource management module 240 would instruct display subsystem 222 to operate in a backlighting-off mode.

A user may choose to select a new primary application while the full-power mode timer and reduced-power mode timer are elapsing based on power requirements for a previously selected primary application. Responsive to an indication that the compute system updated the primary application from a first application having a first application-specific full-power requirement and a first application-specific reduced-power requirement to a second application having a second application-specific full-power requirement and a second application-specific reduced-power requirement, resource management module 240 may then update full-power mode timer 244 based on the second application-specific full-power requirement and update reduced-power mode timer 246 based on the second application specific reduced-power requirement. For example, if the first application-specific full-power requirement was 30 seconds and the second application-specific full-power requirement was 20 seconds, full-power mode timer 244 would be set at 20 seconds at the selection of the new primary application regardless of how much time was left on the full-power mode timer at the moment the primary application is updated. The reduced-power mode timer would be managed in a similar fashion. Resource management module 240 would thus instruct the one or more subsystems to operate in full-power mode for the duration of the updated full-power mode timer, in this case for 20 seconds. Following lapsing of the updated full-power mode timer, resource management module 240 would instruct the one or more subsystems to operate in reduced-power mode for the remaining duration of the updated reduced-power mode timer.

Electronic device 200 may receive various forms of input during operation. Input may include user-originated input received by input subsystem 226. Input may include processed signals originating from sensor suite 228. For example, for a wrist-worn device, the user may issue a reset command by shaking the device back and forth around the user's wrist. An optical heart rate monitor may issue an input command if the user's heart rate increases or decreases above a threshold amount. Input may include indications received via communication subsystem 224. For example, an input may comprise a notification of an incoming text message or email. Compute system 210 may issue inputs based on various system conditions, such as an indication that a battery charge has dropped below a threshold. Input may include indications and notifications from secondary applications, calendars, etc. A reboot or restart of the sensory and logic system, or other conditions that result in display subsystem 222 displaying a home screen may also be considered an input.

Resource management module 240 may receive an indication of an input to electronic device 200. Responsive to receiving an indication of an input to the electronic device, resource management module 240 may increase the duration of full-power mode timer 244 based on a duration of the application-specific full-power requirement for the primary application. For example, primary application 236 may comprise an application-specific full-power requirement of 30 seconds. If an input is received when full-power mode timer 244 has 20 seconds remaining before elapsing, full-power mode timer 244 may be increased to 30 seconds, and begin elapsing from the time the indication of the input is received. In other words, the full-power mode timer is reset to the duration of the application specific full-power requirement at the top of the data structure following the receipt of each indication of input. Similarly, responsive to the indication of an input to the electronic device, resource management module 240 may increase the duration of reduced-power mode timer 246 based on the duration of the application-specific reduced-power requirement for primary application 236.

The indication of input to electronic device 200 may include one or more input-specific power requirements, including an input-specific full-power requirement and an input-specific reduced-power requirement. For example, an indication of an incoming text message may include a 10 second full-power requirement and a 15 second reduced-power requirement. Different inputs within a category may include different input-specific power requirements. For example, an indication of an incoming text message from an acquaintance likely to send multiple text messages in succession may include an indication to instruct the communication subsystem to operate in full-power mode for 30 seconds or more.

In some scenarios, resource management module 240 may receive an indication of an input including an input-specific full-power requirement and an input-specific reduced-power requirement at a time when there is no primary application executing on compute system 210. In such scenarios, resource management module 240 may set full-power mode timer 244 based on the input-specific full-power requirement, and set reduced-power mode timer 246 based on the input-specific reduced-power requirement. For example, displaying the home screen on display subsystem 222 may include a 15 second full-power backlighting requirement and a 25 second reduced-power backlighting requirement. A user closing all applications and landing on the home screen would result in resource management module 240 setting full-power mode timer 244 for 15 seconds and reduced-power mode timer 246 for 25 seconds.

During a condition wherein no primary application is executing on compute system 210 and the full-power mode timer is set based on a first input-specific full-power requirement and the reduced-power mode timer is set based on a first input-specific reduced-power requirement, an indication of an input may be received including a second input-specific full-power requirement and a second input-specific reduced-power requirement. In this scenario, resource management module 240 may increase the duration of the full-power mode timer if the duration of the second input-specific full-power requirement is greater than an amount of time remaining before the full-power mode timer lapses. Resource management module may further increase the duration of the reduced-power mode timer if the duration of the second input-specific reduced-power requirement is greater than an amount of time remaining before the reduced-power mode timer lapses. For example, if an indication of an input including a 10 second full-power requirement is received when the full-power mode timer has 5 seconds remaining before lapsing, the duration of the full-power mode timer may be increased so that it lapses 10 seconds from the receipt of the indication of an incoming text message. However, if the indication of the input including a 10 second full-power requirement is received when the full-power mode timer has 15 seconds remaining before lapsing, the duration of the full-power mode timer would not be adjusted. These scenarios may be summarized with formulas, for example:

New_Full-PowerTime=Max(Old_AbsoluteFull-PowerTime, Incoming Input-SpecificFull-PowerRequirement+current time)

New_Reduced-PowerTime=Max(Old_AbsoluteReduced-PowerTime,Incoming Input-SpecificReduced-PowerRequirement+current time)

Where Old_AbsoluteFull-PowerTime and Old_AbsoluteReduced-PowerTime represent the respective durations remaining on the full-power mode timer and the reduced-power mode timer at the time of the receipt of the indication of input.

In some implementations, input-specific requirements may extend, but may not reduce the durations of the full-power mode timer or reduced-power mode timer. In a scenario where no application is designated as the primary application, the full-power mode timer and reduced-power mode timer may be based solely on input-specific requirements. However, if an application-specific requirement is received by the resource management module (e.g., a user opens a new application) the power mode timers may reset based solely on the application-specific requirement. In other implementations, input-specific requirements may reduce the durations of the full-power mode timer or reduced-power mode timer. For example, a user input may be configured to override the application-specific requirement.

In some examples, each application may segregate various inputs into application-specific inputs and non-application-specific inputs. Application-specific inputs may trigger adjustments to the full-power mode timer and the reduced-power mode timer as described above. However, non-application-specific inputs may extend, but not reset the full-power mode timer and the reduced-power mode timer. For example, an incoming text message may be received while a workout application is the primary application. Rather than updating the power mode timers based on the primary application-specific power mode timers, the resource management module may increase the durations of the power mode timers if the durations of the corresponding non-application-specific power requirements are greater than the amount of time remaining before the power mode timers lapse.

Figure 3:
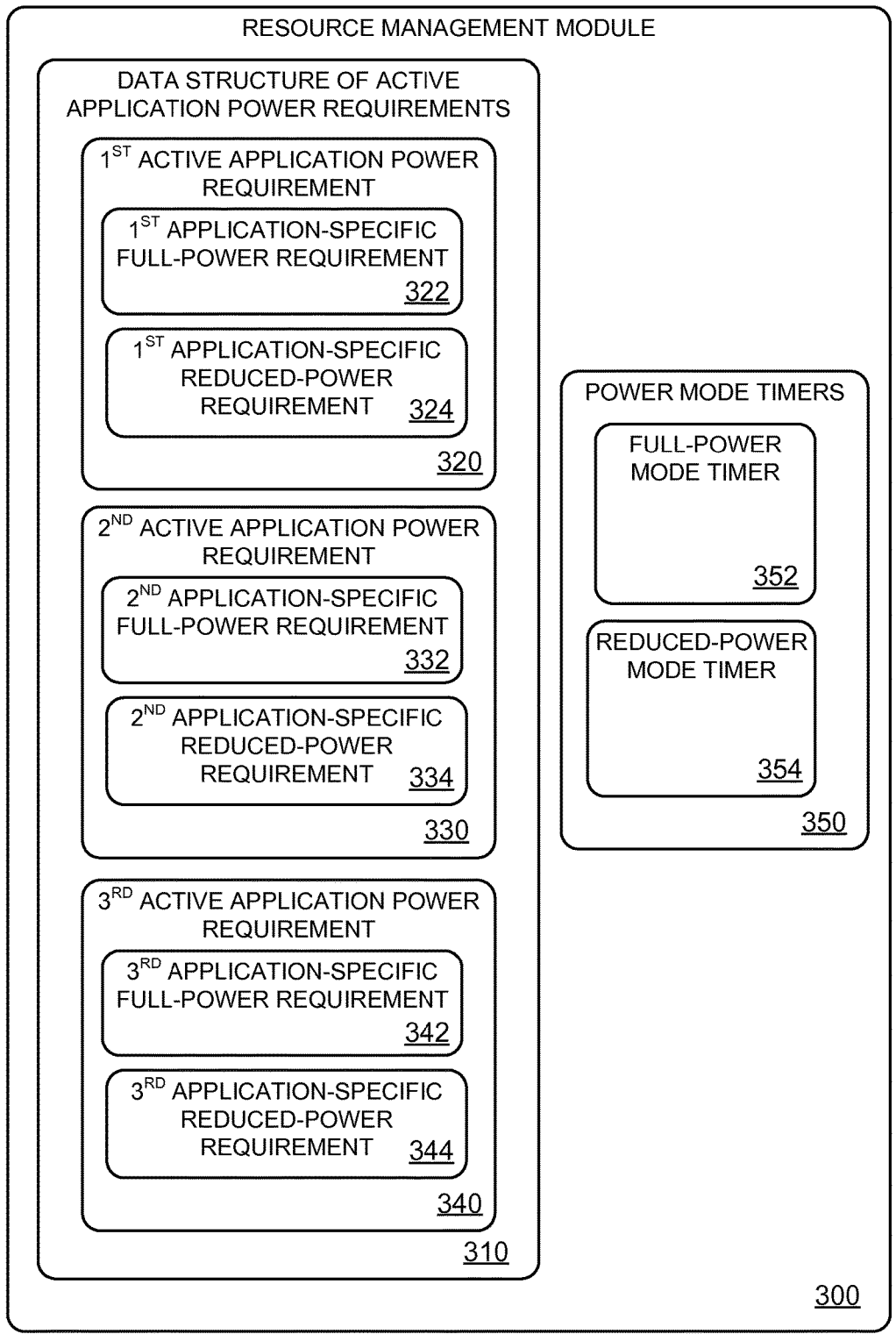
FIG. 3 schematically shows a resource management module including a data structure of active application power requirements.

In order to organize and prioritize application-specific requirements, a resource management module may store active application power requirements in a data structure, the active application power requirements including application-specific full-power requirements and application-specific reduced-power requirements. As one example, such a data structure may be maintained in memory (e.g., RAM). FIG. 3 shows a visual representation of an example resource management module 300 comprising a data structure 310 of active application power requirements. Any suitable data structure may be used. As one example, a stack of power requirements may be maintained in an ordered array, in which a top position of the stack corresponds to a particular member of the array (e.g., first or last indexed member). As used herein, the "top position" is used to refer to any analogous member of any other suitable data structure.

The data structure 310 of active application power requirements includes a $1^{st}$ active application power requirement 320, comprising a $1^{st}$ application-specific full-power requirement 322 and a $1^{st}$ application-specific reduced-power requirement 324. The data structure further includes a $2^{nd}$ active application power requirement 330, comprising a $2^{nd}$ application-specific full-power requirement 332 and a $2^{nd}$ application-specific reduced-power requirement 334, and further includes a $3^{rd}$ active application power requirement 340, comprising a $3^{rd}$ application-specific full-power requirement 342 and a $3^{rd}$ application-specific reduced-power requirement 344. In this example, there are three active applications. However, the data structure may comprise as many active application power requirements as there are active applications executing in an application suite.

Resource management module 300 may update power mode timers 350, including full-power mode timer 352 and reduced-power mode timer 354 based on the active application power requirements stored in data structure 310. For example, resource management module 300 may set full-power mode timer 352 based on an application-specific full-power requirement for an active application power requirement at a top position of the data structure. As shown in FIG. 3, 1st active application power requirement 320 is at a top position of data structure 310. Accordingly, full-power mode timer 352 may be set based on $1^{st}$ application-specific full-power requirement 322. Similarly, resource management module 300 may set reduced-power mode timer 354 based on an application-specific reduced-power requirement for an active application power requirement at a top position of the data structure. In this example, reduced-power mode timer 354 may be set based on $1^{st}$ application-specific reduced-power requirement 324.

An active application power requirement may be placed at the top of data structure 310 responsive to the selection of an application as a primary application. For example, if a user selects a second active application as the primary application, the $2^{nd}$ active application power requirement 330 would be placed at the top of data structure 310. Further, the $1^{st}$ active application may be placed at a second position below the top position of the data structure. Full-power mode timer 352 may be updated based on $2^{nd}$ application-specific full-power requirement 332, and reduced-power mode timer 354 may be updated based on $2^{nd}$ application-specific reduced-power requirement 334. Resource management module 300 may then instruct one or more subsystems to operate in full-power mode for the duration of the updated full-power mode timer, and, responsive to the full-power mode timer lapsing, may instruct the one or more subsystems to operate in a first reduced-power mode for the duration of the updated reduced-power mode timer.

If an application is deactivated, the active application power requirement associated with the deactivated application may be removed from data structure 310. Responsive to a deactivation of the primary application, resource management module 300 may remove the active application power requirement at the top position of data structure 310. In some examples, resource management module 300 may move the active application power requirement in the second position below the top position of the data structure to the top position of the data structure. Resource management module 300 may then update power mode timers 350 based on the active application power requirement at the top position of the data structure. In other examples, resource management module 300 may move the active application power requirement that has been stored in data structure 310 the longest to the top position of the data structure and update power mode timers 350 accordingly. In some examples, the top position of the data structure may be maintained empty following the deactivation of the primary application until a new primary application is selected. Power mode timers may then be set based on any existing input-specific requirements.

While an application-specific power requirement occupies the top position of the data structure, responsive to resource management module 300 receiving an indication of input to the electronic device, resource management module 300 may increase the duration of full-power mode timer 352 based on the application-specific full-power requirement at the top position of data structure 310. Further, resource management module 300 may increase the duration of the reduced-power mode timer 354 based on the application-specific reduced-power requirement at the top position of data structure 310. In other words, the full-power mode timer and reduced-power mode timer are reset to the duration of the application-specific full-power requirement and application-specific reduced-power requirement at the top of the data structure following the receipt of each indication of input.

In some scenarios, responsive to resource management module 300 receiving an indication of input to the electronic device, resource management module 300 may increase the duration of full-power mode timer 352 if a duration of the application-specific full-power requirement at the top position of data structure 310 is greater than an amount of time remaining before full-power mode timer 352 lapses. Further, resource management module 300 may increase the duration of reduced-power mode timer 354 if a duration of the application-specific reduced-power requirement at the top position of data structure 310 is greater than an amount of time remaining before reduced-power mode timer 354 lapses.

If an indication of a first input is received including a first input-specific full-power requirement and a first input-specific reduced-power requirement while data structure 310 is empty, resource management module 300 may set the full-power mode timer based on the first input-specific full-power requirement and may set the reduced-power mode timer based on the first input-specific reduced-power requirement.

If an indication of a second input including a second input-specific full-power requirement and a second input-specific reduced-power requirement is received while data structure 310 remains empty, resource management module 300 may increase the duration of the full-power mode timer if the duration of the second input-specific full-power requirement is greater than the amount of time remaining before the full-power mode timer lapses. Resource management module 300 may further increase the duration of the reduced-power mode timer if the duration of the second input-specific reduced-power requirement is greater than an amount of time remaining before the reduced-power mode timer lapses.

In some examples, data structure 310 may be configured to comprise a single active application power requirement. Each received triggering event may then be evaluated based on the power requirements of single active application power requirement in data structure 310. The triggering events may reset, reinstate, alter, and/or override the single active application power requirement, or may prompt switching of the single active application power requirement for a new active application power requirement. In this way, the footprint of the resource management module may be reduced while still providing dynamic resource management for the electronic device.

FIGS. 4A-4D show an example timeline for an electronic device utilizing the resource management module 300 of FIG. 3 to regulate backlighting power modes of a display subsystem. A data structure of active application power requirements is shown at 402. Current input-specific power requirements are shown at 404. Backlighting power mode timers, including a full-power backlighting power mode timer and a reduced-power backlighting mode timer are shown at 406. Events that are processed by a resource management module are shown at 408. A timeline indicates time in seconds beginning at an initial event in panel 410. The timeline for consecutive panels overlap. Each panel of FIGS. 4A-4D includes a single event. The data structure of active application power requirements, the current input-specific power requirements, and the backlighting power mode timers are updated for each panel based on the included event.

Figure 4A:
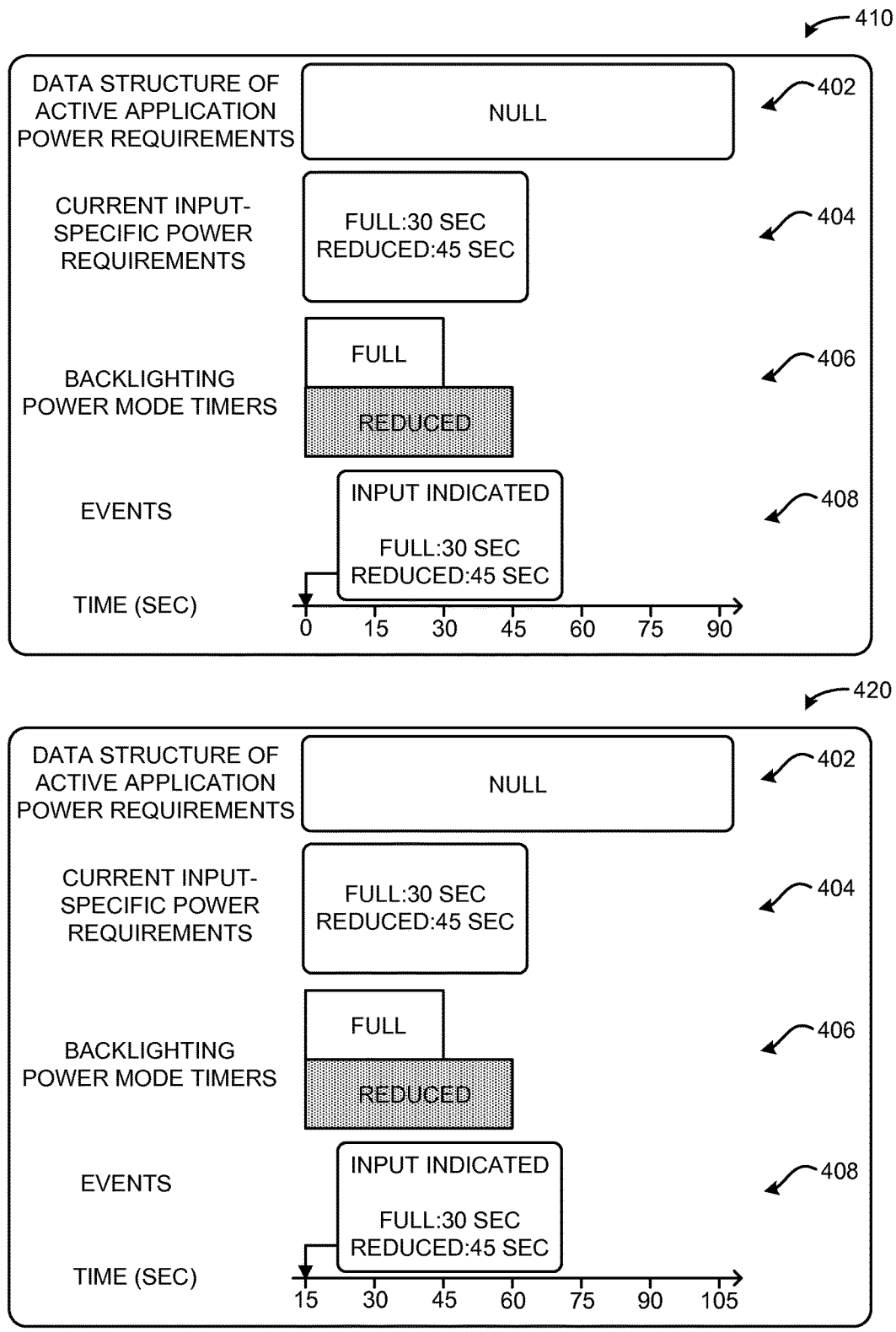
FIGS. 4A-4D somewhat schematically show adjusting backlighting power mode timers for an electronic device over time.

Beginning at FIG. 4A, at 410, an input is indicated at 0 seconds of the timeline. The indicated input includes an input-specific full-power requirement of 30 seconds, and an input-specific reduced-power requirement of 45 seconds. As the data structure of active application power requirements is empty, the full-power and reduced-power backlighting mode timers are set based on the input-specific power requirements. In the absence of additional input, the resource management module will instruct the backlight to operate at full power from 0-30 seconds, and in a first reduced-power mode from 30-45 seconds.

In panel 420, an input is indicated at 15 seconds of the timeline. The indicated input includes an input-specific full-power requirement of 30 seconds, and an input-specific reduced-power requirement of 45 seconds. As the data structure of active application power requirements is empty, the incoming input-specific requirements are compared to the remaining durations of the backlighting power mode timers. As the incoming input-specific requirements are greater than the remaining durations of the backlighting power mode timers, the full-power and reduced-power backlighting mode timers are set based on the incoming input-specific power requirements. In the absence of additional input, the resource management module will instruct the backlight to operate at full power from 15-45 seconds, and in a first reduced-power mode from 45-60 seconds.

Figure 4B:
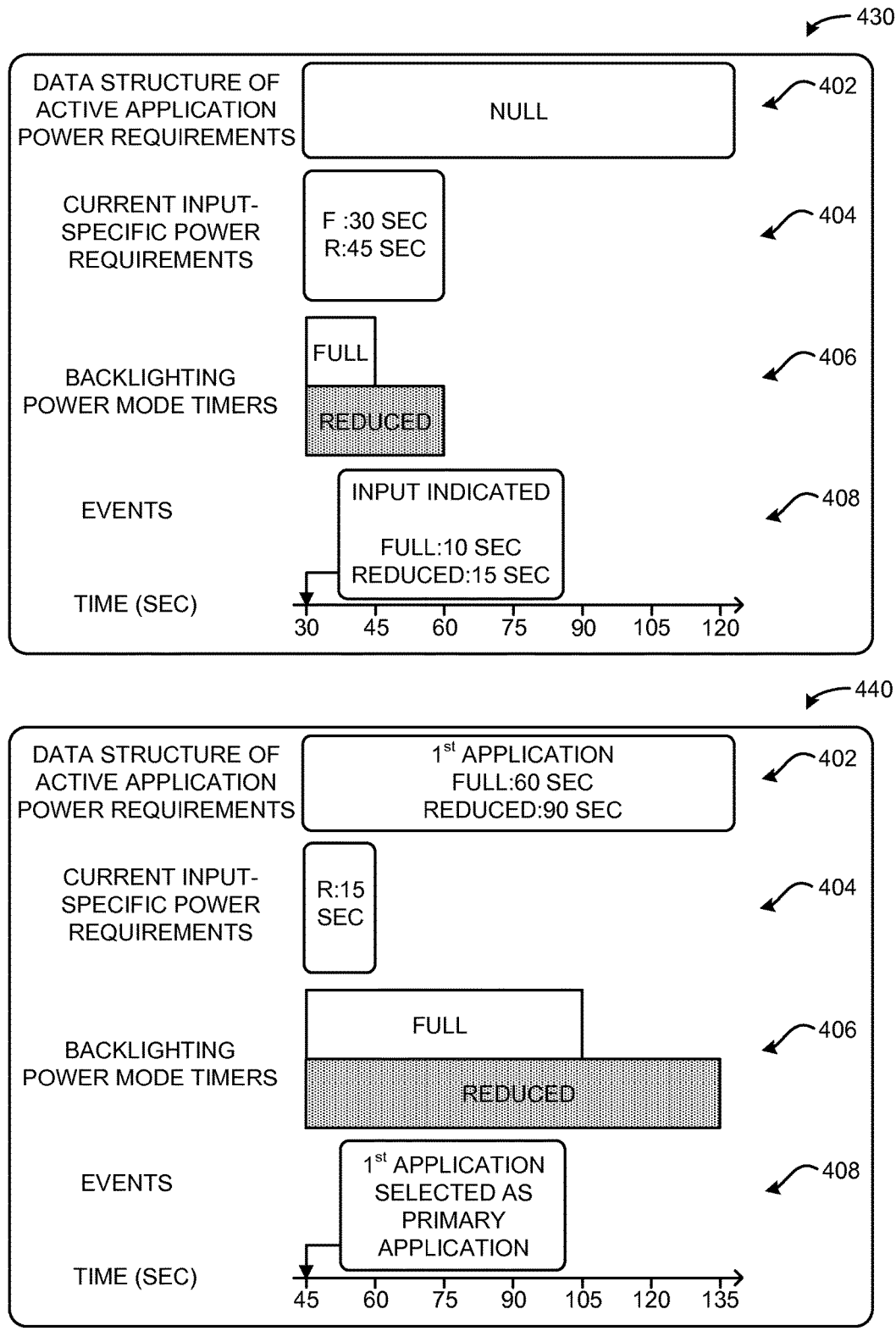

Turning to FIG. 4B, in panel 430, an input is indicated at 30 seconds of the timeline. The indicated input includes an input-specific full-power requirement of 10 seconds, and an input-specific reduced-power requirement of 15 seconds. As the duration of the input-specific full-power requirement is less than the amount of time remaining before the full-power mode timer lapses, the full-power mode timer is not updated. Similarly, as the duration of the input-specific reduced-power requirement is less than the amount of time remaining before the reduced-power mode timer lapses, the reduced-power mode timer is not updated.

In panel 440, a first application ($1^{st}$ Application) is selected as a primary application at 45 seconds of the timeline, as shown at 408. The active application power requirements for the $1^{st}$ Application are placed at the top of the data structure of active application power requirements, as shown at 402. The active application power requirements for the $1^{st}$ Application include an application-specific full-power requirement of 60 seconds, and an application-specific reduced-power requirement of 90 seconds. The full-power and reduced-power mode backlighting timers are set according to the application-specific power requirements, overriding the residual input-specific power requirements, as shown at 406. In the absence of additional input, the resource management module will instruct the backlight to operate at full power from 45-105 seconds, and in a first reduced-power mode from 105-135 seconds.

Figure 4C:
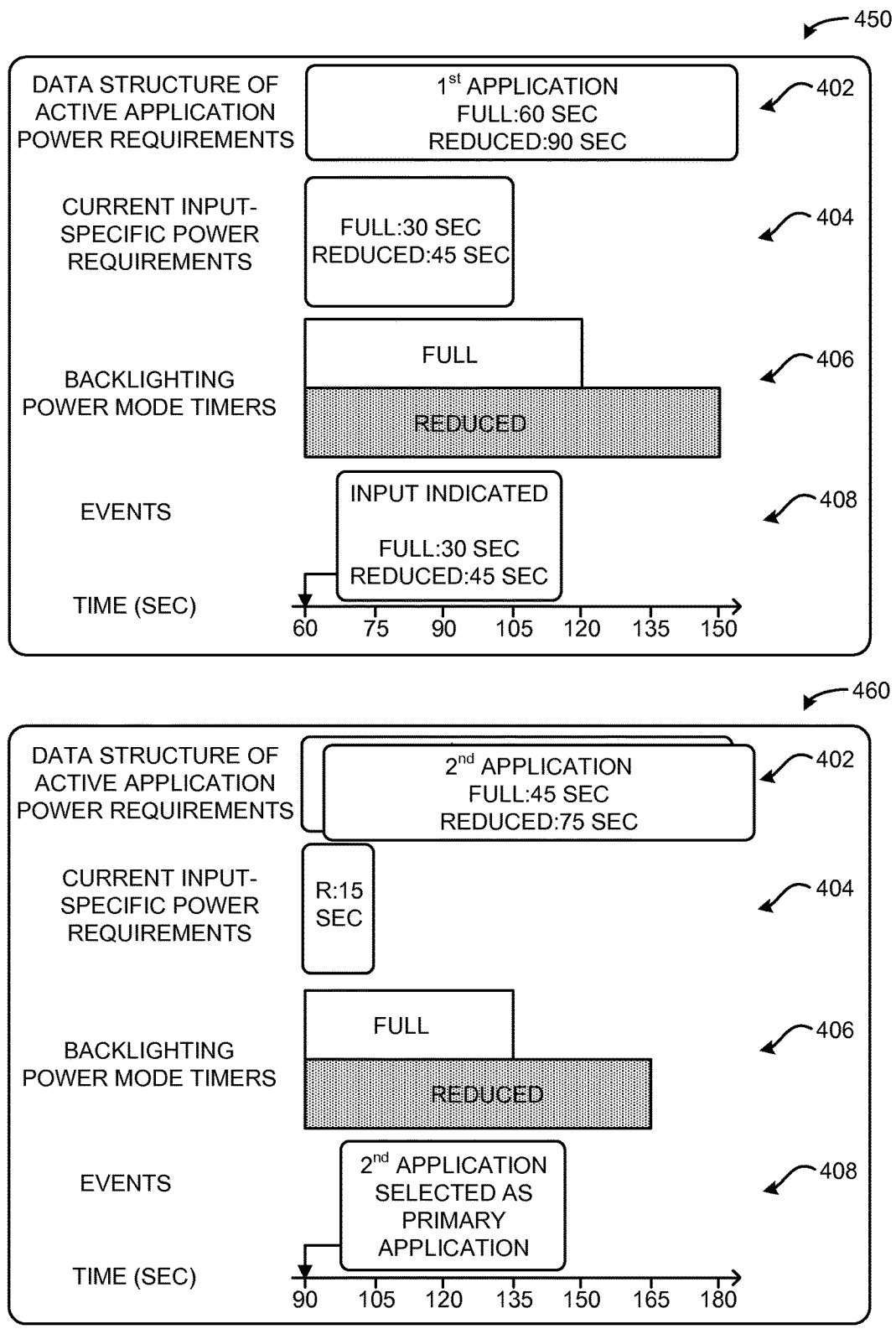

Turning to FIG. 4C, in panel 450, an input is indicated at 60 seconds of the timeline. The indicated input includes an input-specific full-power requirement of 30 seconds, and an input-specific reduced-power requirement of 45 seconds. As the $1^{st}$ application-specific power requirements are at the top of the data structure, the input causes the backlighting power mode timers to be reset based on the $1^{st}$ application-specific power requirements. Accordingly, the full-power mode timer is set for 60 seconds beginning at the receipt of the indication of input, and the reduced-power mode timer is set for 90 seconds beginning at the receipt of the indication of input. In the absence of additional input, the resource management module will instruct the backlight to operate at full power from 60-120 seconds, and in a first reduced-power mode from 120-150 seconds.

In panel 460, a second application ($2^{nd}$ Application) is selected as a primary application at 90 seconds of the timeline. The active application power requirements for the $2^{nd}$ Application are placed at the top of the data structure of active application power requirements. The active application power requirements for the $1^{st}$ Application are placed at a second position in the data structure, below the top position, as shown at 402. The active application power requirements for the $2^{nd}$ Application include an application-specific full-power requirement of 45 seconds, and an application-specific reduced-power requirement of 75 seconds. The full-power and reduced-power mode backlighting timers are updated based on the active application power requirements for the $2^{nd}$ Application. In the absence of additional input, the power control module will instruct the backlight to operate at full power from 90-135 seconds, and in a first reduced-power mode from 135-165 seconds.

Figure 4D:
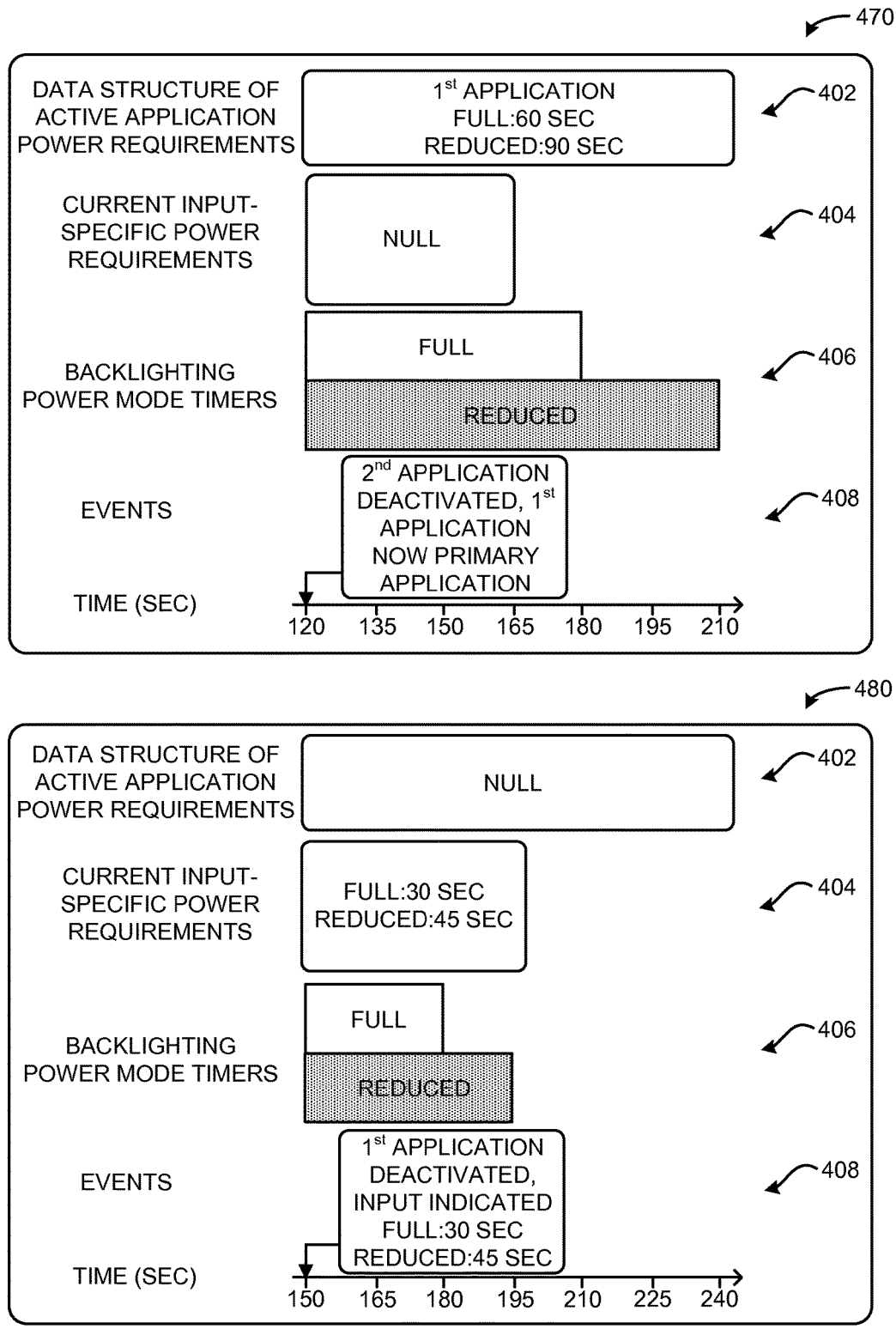

Turning to FIG. 4D, in panel 470, the $2^{nd}$ Application is deactivated at 120 seconds of the timeline. Accordingly, the $2^{nd}$ Application active application power requirements are removed from the data structure, as shown at 402. The $1^{st}$ Application is promoted to the primary application. The active application power requirements for the $1^{st}$ Application are thus moved to the top of the data structure. The full-power and reduced-power mode backlighting timers are set according to the $1^{st}$ application specific power requirements, as shown at 406. In the absence of additional input, the power control module will instruct the backlight to operate at full power from 120-180 seconds, and in the first reduced-power mode from 180-210 seconds.

In panel 480, the $1^{st}$ Application is deactivated at 150 seconds of the timeline. Accordingly, the $1^{st}$ Application active application power requirements are removed from the data structure, as shown at 402. The data structure of active application power requirements is now empty. An input is indicated at 150 seconds based on the device returning to a home screen in the absence of any active applications. The indicated input includes an input-specific full-power requirement of 30 seconds, and an input-specific reduced-power requirement of 45 seconds. As the data structure is now empty, both the full-power mode timer and reduced-power mode timer are updated based on the input-specific power requirements. In the absence of additional input, the power control module will instruct the backlight to operate at full power from 150-180 seconds, and in the first reduced-power mode from 180-195 seconds. In this scenario, all previous input-specific requirements had expired at 150 seconds of the timeline. However, if any previous input-specific requirements had been received and had full-power and/or reduced-power mode requirements that had not expired, all current input-specific requirements would be compared, and the power mode timers would be set based on the durations of the maximum remaining input-specific requirements.

The above are nonlimiting examples that demonstrate the flexible resource management that is provided by the resource management module. The individual requirements for any applications, inputs, and/or other triggering events and/or requirement holders may be tuned to achieve any resource management scheme.

As evident from the foregoing description, the methods and processes described herein may be tied to a sensory-and-logic system of one or more machines. Such methods and processes may be implemented as a computer-application program or service, an application-programming interface (API), a library, firmware, and/or other computer-program product. FIGS. 1A and 1B show one, non-limiting example of a sensory-and-logic system to enact the methods and processes described herein. FIG. 2 shows another example of a generic electronic device for executing the resource management strategies described above. However, these methods and process may also be enacted on sensory-and-logic systems of other configurations and form factors, as shown schematically in FIG. 5.

Figure 5:
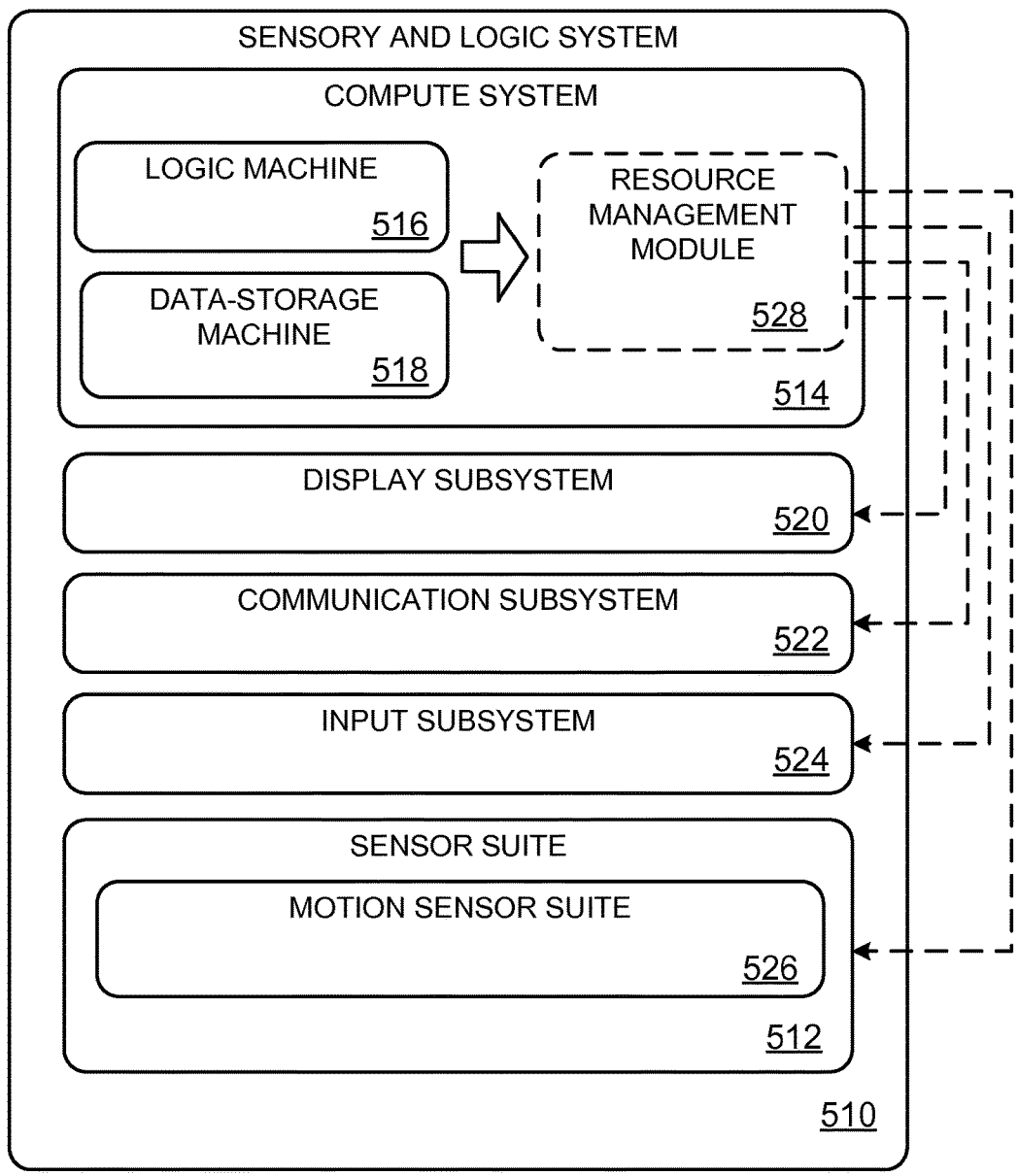
FIG. 5 schematically shows a sensory-and-logic system usable to dynamically manage power modes of one or more electronic device subsystems.

FIG. 5 schematically shows a form-agnostic sensory-and-logic system 510 that includes a sensor suite 512 operatively coupled to a compute system 514. The compute system includes a logic machine 516 and a data-storage machine 518. The compute system is operatively coupled to a display subsystem 520, a communication subsystem 522, an input subsystem 524, and/or other components not shown in FIG. 6.

Logic machine 516 includes one or more physical devices configured to execute instructions. The logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 516 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices in a cloud-computing configuration.

Data-storage machine 518 includes one or more physical devices configured to hold instructions executable by logic machine 516 to implement the methods and processes described herein. When such methods and processes are implemented, the state of the data-storage machine may be transformed—e.g., to hold different data. The data-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The data-storage machine may include volatile, nonvolatile, dynamic, static, read/write, read-only, random-access, sequential-access, location-addressable, file-addressable, and/or content-addressable devices.

Data-storage machine 518 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 516 and data-storage machine 518 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 520 may be used to present a visual representation of data held by data-storage machine 518. This visual representation may take the form of a graphical user interface (GUI). As the herein described methods and processes change the data held by the storage machine, and thus transform the state of the storage machine, the state of display subsystem 520 may likewise be transformed to visually represent changes in the underlying data. Display subsystem 520 may include one or more display subsystem devices utilizing virtually any type of technology. Such display subsystem devices may be combined with logic machine 516 and/or data-storage machine 518 in a shared enclosure, or such display subsystem devices may be peripheral display subsystem devices. Display 20 of FIGS. 1A and 1B is an example of display subsystem 520.

Communication subsystem 522 may be configured to communicatively couple compute system 514 to one or more other computing devices. The communication subsystem may include wired and/or wireless communication devices compatible with one or more different communication protocols. As non-limiting examples, the communication subsystem may be configured for communication via a wireless telephone network, a local- or wide-area network, and/or the Internet. Communication suite 24 of FIGS. 1A and 1B is an example of communication subsystem 522.

Input subsystem 524 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Touch-screen sensor 32 and push buttons 34 of FIGS. 1A and 1B are examples of input subsystem 524.

Sensor suite 512 may include one or more different sensors—e.g., a touch-screen sensor, push-button sensor, microphone, visible-light sensor, ultraviolet sensor, ambient-temperature sensor, contact sensors, and/or GPS receiver—as described above with reference to FIGS. 1A and 1B. Sensor suite 512 may include motion sensor suite 526. Motion sensor suite 526 may include one or more of an accelerometer, gyroscope, magnetometer, or other suitable motion detectors.

Resource management module 528 may receive information regarding applications executing on compute system 514, and may further receive information regarding input to sensory-and-logic system 510. Based on the received information, resource management module 528 may issue instructions to one or more subsystems, including display subsystem 520, communication subsystem 522, input subsystem 524, and sensor suite 512. Resource management module 528 may instruct one or more subsystems to operate in a full-power mode and may further instruct one or more subsystems to operate in one or more reduced-power modes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An electronic device, comprising:
   a compute system configured to concurrently execute a primary application and one or more secondary applications;
   one or more subsystems configured to operate in a full-power mode and further configured to operate in one or more reduced-power modes; and
   a resource management module comprising one or more power mode timers, the resource management module configured to:
      set a full-power mode timer based on an application-specific full-power requirement for the primary application executing on the electronic device;
      set a reduced-power mode timer based on an application-specific reduced-power requirement for the primary application executing on the electronic device, the reduced-power mode timer indicating a duration for the one or more subsystems to consume at least a reduced level of energy;
      instruct the one or more subsystems to operate in full-power mode for a duration of the full-power mode timer;
      responsive to receiving an indication of an input to the electronic device, increase the duration of the full-power mode timer based on a duration of the application-specific full-power requirement for the primary application; and
      responsive to the full-power mode timer lapsing, instruct the one or more subsystems to operate in a first reduced-power mode for a remaining duration of the reduced-power mode timer.

2. The electronic device of claim 1, wherein the resource management module is further configured to:
   responsive to an indication that the compute system updated the primary application from a first application having a first application-specific full-power requirement to a second application having a second application-specific full-power requirement, update the full-power mode timer based on the second application-specific full-power requirement; and
   instruct the one or more subsystems to operate in full-power mode for the duration of the updated full-power mode timer.

3. The electronic device of claim 1, wherein the resource management module is further configured to:
   responsive to the indication of an input to the electronic device, increase the duration of the reduced-power mode timer based on a duration of the application-specific reduced-power requirement for the primary application; and
   responsive to an indication that the compute system updated the primary application from a first application having a first application-specific reduced-power requirement to a second application having a second application-specific reduced-power requirement, update the reduced-power mode timer based on the second application-specific reduced-power requirement.

4. The electronic device of claim 3, wherein the resource management module is further configured to:
   responsive to the reduced-power mode timer lapsing, instruct the one or more subsystems to operate in a second reduced-power mode, the second reduced-power mode consuming less power than the first reduced-power mode.

5. The electronic device of claim 1, wherein the resource management module is further configured to:
   receive an indication of an input including an input-specific full-power requirement and an input-specific reduced-power requirement;
   responsive to no primary application executing on the compute system, set the full-power mode timer based on the input-specific full-power requirement; and
   set the reduced-power mode timer based on the input-specific reduced-power requirement.

6. The electronic device of claim 5, wherein the resource management module is further configured to:
   during a condition where no primary application is executing on the compute system and wherein the full-power mode timer is set based on a first input-specific full-power requirement and the reduced-power mode timer is set based on a first input-specific reduced-power requirement, receive an indication of an input including a second input-specific full-power requirement and a second input-specific reduced-power requirement;
   increase the duration of the full-power mode timer if the duration of the second input-specific full-power requirement is greater than an amount of time remaining before the full-power mode timer lapses; and
   increase the duration of the reduced-power mode timer if the duration of the second input-specific reduced-power requirement is greater than an amount of time remaining before the reduced-power mode timer lapses.

7. The electronic device of claim 1, wherein the one or more subsystems configured to operate in a full-power mode and further configured to operate in one or more reduced-power modes include a display subsystem.

8. The electronic device of claim 7 wherein the full-power mode for the display subsystem includes a full-power backlighting mode, and the one or more reduced-power modes for the display subsystem include a dimmed backlighting mode.

9. The electronic device of claim 1, wherein the resource management module is further configured to:
   responsive to the reduced-power mode timer lapsing, instruct the one or more subsystems to operate in a second reduced-power mode, the second reduced-power mode consuming less power than the first reduced-power mode.

10. An electronic device, comprising:
    a compute system configured to execute two or more applications concurrently;
    one or more subsystems configured to operate in a full-power mode and further configured to operate in one or more reduced-power modes; and
    a resource management module comprising one or more power mode timers, the resource management module configured to:
       store active application-specific power requirements in a data structure, the active application-specific power requirements including application-specific full-power requirements;

set a full-power mode timer based on an application-specific full-power requirement for an active application-specific power requirement at a top position of the data structure;

instruct the one or more subsystems to operate in full-power mode for a duration of the full-power mode timer;

responsive to a selection of a first active application as a primary application, the first active application having a first active application-specific power requirement including a first application-specific full-power requirement, place the first active application-specific power requirement at the top position of the data structure;

update the full-power mode timer based on the first application-specific full-power requirement;

instruct the one or more subsystems to operate in full-power mode for a duration of the updated full-power mode timer;

responsive to a selection of a second active application as the primary application, the second active application having a second active application-specific power requirement including a second application-specific full-power requirement, place the second active application-specific power requirement at the top position of the data structure;

place the first active application-specific power requirement at a second position below the top position of the data structure;

update the full-power mode timer based on the second application-specific full-power requirement; and instruct the one or more subsystems to operate in full-power mode for the duration of the updated full-power mode timer.

11. The electronic device of claim 10, where the resource management module is further configured to:

responsive to a deactivation of the primary application, remove the active application-specific power requirement at the top position of the data structure;

move the active application-specific power requirement in the second position below the top position of the data structure to the top position of the data structure;

update the full-power mode timer based on the application-specific full-power requirement of the active application-specific power requirement at the top position of the data structure; and instruct the one or more subsystems to operate in full-power mode for a duration of the updated full-power mode timer.

12. The electronic device of claim 10, where the active application-specific power requirements further comprise application-specific reduced-power requirements, and wherein the resource management module is further configured to:

set a reduced-power mode timer equal to an application-specific reduced-power requirement for the active application-specific power requirement at the top position of the data structure; and responsive to the full-power mode timer lapsing, instruct the one or more subsystems to operate in a first reduced-power mode for a remaining duration of the reduced-power mode timer.

13. The electronic device of claim 12, wherein the resource management module is further configured to:

responsive to the reduced-power mode timer lapsing, instruct the one or more subsystems to operate in a second reduced-power mode, the second reduced-power mode consuming less power than the first reduced-power mode.

14. The electronic device of claim 13, wherein the one or more subsystems configured to operate in a full-power mode and further configured to operate in one or more reduced-power modes include a display subsystem.

15. The electronic device of claim 14, wherein the full-power mode for the display subsystem includes a full-power backlighting mode, the first reduced-power mode for the display subsystem includes a dimmed backlighting mode, and the second reduced-power mode for the display subsystem includes a backlighting-off mode.

16. The electronic device of claim 12, wherein the resource management module is further configured to:

receive an indication of an input to the electronic device;

increase the duration of the full-power mode timer based on a duration of the application-specific full-power requirement at the top position of the data structure; and increase the duration of the reduced-power mode timer based on a duration of the application-specific reduced-power requirement at the top position of the data structure.

17. The electronic device of claim 16, wherein the resource management module is further configured to:

receive an indication of an input to the electronic device including an input-specific full-power requirement and an input-specific reduced-power requirement;

set the full-power mode timer based on the input-specific full-power requirement responsive to the data structure of active application-specific power requirements being empty; and set the reduced-power mode timer based on the input-specific reduced-power requirement responsive to the data structure of active application-specific power requirements being empty.

18. The electronic device of claim 17, wherein the resource management module is further configured to:

during a condition where the data structure of active application-specific power requirements is empty and wherein the full-power mode timer is set based on a first input-specific full-power requirement and the reduced-power mode timer is set based on a first input-specific reduced-power requirement, receive an indication of an input including a second input-specific full-power requirement and a second input-specific reduced-power requirement;

increase the duration of the full-power mode timer if the duration of the second input-specific full-power requirement is greater than an amount of time remaining before the full-power mode timer lapses; and increase the duration of the reduced-power mode timer if the duration of the second input-specific reduced-power requirement is greater than an amount of time remaining before the reduced-power mode timer lapses.

19. An electronic device, comprising:

a display circuit configured to operate in a full-power backlighting mode and further configured to operate in a reduced-power backlighting mode; and a resource management module comprising a full-power backlighting mode timer and a reduced-power backlighting mode timer, the resource management module configured to:

store active application-specific backlighting requirements in a data structure, the active application-specific backlighting requirements including application-specific full-power backlighting requirements and further including application-specific reduced-power backlighting requirements;

responsive to a selection of a first active application as a primary application, the first active application having a first application-specific backlighting requirement including a first application-specific full power backlighting requirement, place the first application-specific backlighting requirement at a top position of the data structure;

set a full-power backlighting mode timer based on the first application-specific full-power backlighting requirement;

instruct the display circuit to operate in full-power backlighting mode for a duration of the full-power backlighting mode timer;

responsive to the full-power backlighting mode timer lapsing, instruct the display circuit to operate in reduced-power backlighting mode for a remaining duration of the reduced-power backlighting mode timer;

responsive to the reduced-power backlighting mode timer lapsing, instruct the display circuit to operate in a backlighting-off mode;

responsive to a deactivation of the primary application, remove the application-specific backlighting requirement at the top position of the data structure;

move an active application-specific backlighting requirement in a second position below the top position of the data structure to the top position of the data structure;

update the full-power backlighting timer based on the application-specific full-power backlighting requirement of the active application-specific backlighting requirement at the top position of the data structure; and instruct the one or more subsystems to operate in full-power mode for a duration of the updated full-power mode timer.

20. The electronic device of claim 19, wherein the resource management module is further configured to:

receive an indication of an input to the electronic device, the indication including an input-specific full-power backlighting requirement and an input-specific reduced-power backlighting requirement;

increase the duration of the full-power mode timer if the duration of the application-specific full-power requirement at the top position of the data structure is greater than an amount of time remaining before the full-power mode timer lapses; and increase the duration of the reduced-power mode timer if the duration of the application-specific reduced-power requirement at the top position of the data structure is greater than an amount of time remaining before the reduced-power mode timer lapses.

* * * * *